US010194348B2

(12) United States Patent
Agrawal et al.

(10) Patent No.: US 10,194,348 B2
(45) Date of Patent: Jan. 29, 2019

(54) TECHNIQUES AND APPARATUSES FOR IMPROVED ROBUST HEADER COMPRESSION (ROHC) DECOMPRESSION

(71) Applicant: QUALCOMM Incorporated, San Diego, CA (US)

(72) Inventors: Ambuj Agrawal, San Diego, CA (US); Abdul Basith, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 189 days.

(21) Appl. No.: 15/167,173

(22) Filed: May 27, 2016

(65) Prior Publication Data
US 2017/0347290 A1    Nov. 30, 2017

(51) Int. Cl.
H04W 28/06    (2009.01)
H04L 29/06    (2006.01)

(52) U.S. Cl.
CPC ............. *H04W 28/06* (2013.01); *H04L 69/04* (2013.01); *H04L 69/22* (2013.01)

(58) Field of Classification Search
None
See application file for complete search history.

(56) References Cited

U.S. PATENT DOCUMENTS

| 8,165,104 | B2 | 4/2012 | Agashe et al. | |
|---|---|---|---|---|
| 8,418,037 | B2 | 4/2013 | Li et al. | |
| 2006/0120352 | A1* | 6/2006 | Agashe | H04L 69/04 370/352 |
| 2012/0113993 | A1* | 5/2012 | Sridhar | H04L 65/604 370/474 |
| 2012/0177064 | A1* | 7/2012 | Shi | H04L 69/04 370/477 |
| 2012/0189023 | A1* | 7/2012 | Huang | H04L 1/0006 370/477 |
| 2013/0279522 | A1 | 10/2013 | Zhang | |

(Continued)

OTHER PUBLICATIONS

Bormann C., et al., "RObust Header Compression (ROHC): Framework and Four Profiles: RTP, UDP, ESP, and Uncompressed; rfc3095.txt", 5. JCT-VC Meeting; 96. MPEG Meeting; Mar. 16, 2011-Mar. 23, 2011; Geneva; (Joint Collaborative Team on Video Coding of ISO/IEC JTC1/SC29/WG11 and ITU-T SG.16); URL: http://WFTP3.ITU.INT/AV-ARCH/JCTVC-SITE/, Internet Engineering Task Force, IETF, CH, Jul. 1, 2001 (Jul. 1, 2001), pp. 1-168, XP015008878, ISSN: 0000-0003.

(Continued)

*Primary Examiner* — Donald L Mills
(74) *Attorney, Agent, or Firm* — Harrity & Harrity, LLP

(57) ABSTRACT

Certain aspects of the present disclosure generally relate to wireless communications. In some aspects, a wireless communication device may determine a decompression failure associated with a header of a received packet and a first real-time transport protocol (RTP) sequence number (SN) interpretation window. In some aspects, the wireless communication device may perform a decompression of the header of the received packet using a second RTP SN interpretation window. The second RTP SN interpretation window may be selected based on at least one of one or more values for the first RTP SN interpretation window or a size of the first RTP SN interpretation window.

30 Claims, 12 Drawing Sheets

(56) References Cited

U.S. PATENT DOCUMENTS

2015/0237179 A1*  8/2015  Sridhar .................. H04L 69/22
                                                     370/474
2015/0280905 A1* 10/2015  Shah ....................... H04L 7/048
                                                     370/504
2016/0241685 A1*  8/2016  Shah ....................... H04L 69/04

OTHER PUBLICATIONS

International Search Report and Written Opinion—PCT/US2017/033521—ISA/EPO—dated Aug. 14, 2017.
Pelletier G., et al., "RObust Header Compression (ROHC): ROHC over Channels That Can Reorder Packets," Network Working Group, Request for Comments: 4224, Category: Informational, Jan. 2006, 21 pages.
Siemens: "Discussion of ROHC Parameters," R2-040995, 3GPP TSG-RAN2 Meeting #42, Montreal, Canada, May 10-14, 2004, 9 pages.

* cited by examiner

Actual RTP SN: 5006

```
2016 Jan 7 01:14:19.776 [197/0xCS] 0x1362 RoHC Decompressor
RoHC Instance                        : 51249344
CID                                  : 0
Profile                              : 1 (RTP)
Mode                                 : 1 (O-mode)
State                                : 2 (FC)
Error                                : 0
Packet Type                          : 17 (UOO)
Compressed Header Size               : 3
Original Header Size                 : 40
RTP SN                               : 5006
RTP SN Window Size                   : 16
Min SN Value in this Window          : 5003
Max Sn Value in this Window          : 5018
RTP TS                               : 3872960
RTP TS Scaled                        : 12103
RTP TS Window Size                   : 0
Min Scaled TS in this window         : 0
Max Scaled TS in this window         : 0
```

$f(v\_ref, k, p) = [v\_ref - p, v\_ref + (2^k - 1) - p]$
$f(5004, 4, 1) = [5004-1, 5004 + (2^4 - 1) - 1]$
$f_{init} = [5003, 5018]$
Find: 0b1110 in [5003, 5018] -> 5006
CRC: Pass
New v_ref: 5006

Perform decompression for a header of a first packet

Actual RTP SN: 5008

```
2016 Jan 7 01:14:19.836 [128/0x80] 0x1362 RoHC Decompressor
RoHC Instance                         : 51249344
CID                                   : 0
Profile                               : 1 (RTP)
Mode                                  : 1 (O-mode)
State                                 : 2 (FC)
Error                                 : 0
Packet Type                           : 17 (UO0)
Compressed Header Size                : 3
Original Header Size                  : 40
RTP SN                                : 5008
RTP SN Window Size                    : 14
Min SN Value in this Window           : 5005
Max Sn Value in this Window           : 5020
RTP TS                                : 3873600
RTP TS Scaled                         : 12105
RTP TS Window Size                    : 0
Min Scaled TS in this window          : 0
Max Scaled TS in this window          : 0
```

$f(5006, 4, 1) = [5006 - 1, 5006 + (2^4 - 1) - 1]$
$f_{int.} = [5005, 5020]$
Find: 0b0000 in [5005, 5020] -> 5008
CRC: Pass
New v_ref: 5008

Perform decompression for a header of a second packet

Actual RTP SN: 5009

```
2016 Jan 7 01:14:19.836 [128/0x80] 0x1362 RoHC Decompressor
RoHC Instance                    = 51124934
CID                              = 0
Profile                          = 1 (RTP)
Mode                             = 1 (O-mode)
State                            = 2 (FC)
Error                            = 0
Packet Type                      = 17 (UO0)
Compressed Header Size           = 3
Original Header Size             = 40
RTP SN                           = 5009
RTP SN Window Size               = 16
Min SN Value in this Window      = 5007
Max SN Value in this Window      = 5022
RTP TS                           = 3873920
RTP TS Scaled                    = 1206
RTP TS Window Size               = 0
Min Scaled TS in this window     = 0
Max Scaled TS in this window     = 0
``` f(5008, 4, 1) = [5008 - 1, 5008 + (2$^4$ - 1) - 1]
f$_{init}$ = [5007, 5022]
Find: 0b0001 in [5007, 5022] -> 5009
CRC: Pass
New v_ref: 5009

Perform decompression for a header of a third packet

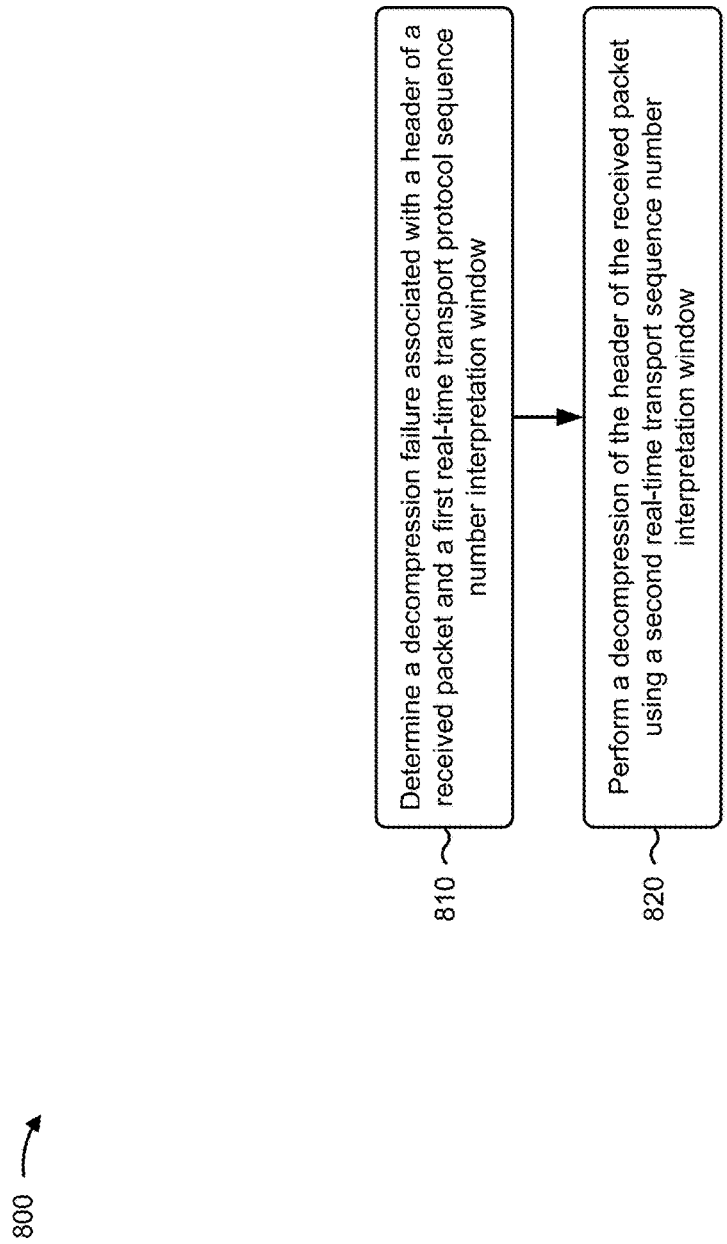

TECHNIQUES AND APPARATUSES FOR IMPROVED ROBUST HEADER COMPRESSION (ROHC) DECOMPRESSION

FIELD OF THE DISCLOSURE

Aspects of the present disclosure generally relate to wireless communications, and more particularly to techniques and apparatuses for improved robust header compression (RoHC) decompression, for example, techniques and apparatuses for performing an RoHC decompression of a header of a received packet using an altered real-time transport protocol (RTP) sequence number (SN) interpretation window.

BACKGROUND

Wireless communication systems are widely deployed to provide various telecommunication services, such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency divisional multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, a national, a regional, and even a global level. An example of a telecommunication standard is Long Term Evolution (LTE). LTE is a set of enhancements to the Universal Mobile Telecommunications System (UMTS) mobile standard promulgated by Third Generation Partnership Project (3GPP). LTE is designed to better support mobile broadband Internet access by improving spectral efficiency, lowering costs, improving services, using new spectrum, and integrating with other open standards using OFDMA on the downlink (DL), SC-FDMA on the uplink (UL), and multiple-input multiple-output (MIMO) antenna technology.

SUMMARY

In some aspects, a method of wireless communication may include determining, by a wireless communication device, a decompression failure associated with a header of a received packet and a first real-time transport protocol (RTP) sequence number (SN) interpretation window. The method may include performing, by the wireless communication device, a decompression of the header of the received packet using a second RTP SN interpretation window. The second RTP SN interpretation window may be selected by the wireless communication device based on at least one of one or more values of the first RTP SN interpretation window or a size of the first RTP SN interpretation window.

In some aspects, a wireless communication device may include one or more processors configured to determine a decompression failure associated with a header of a received packet and a first RTP SN interpretation window. The one or more processors may be configured to perform a decompression of the header of the received packet using a second RTP SN interpretation window. The second RTP SN interpretation window may be selected by the wireless communication device based on at least one of one or more values of the first RTP SN interpretation window or a size of the first RTP SN interpretation window.

In some aspects, a non-transitory computer-readable medium may store one or more instructions for wireless communication. The one or more instructions may include one or more instructions that, when executed by one or more processors of a wireless communication device, cause the one or more processors to determine a decompression failure associated with a header of a received packet and a first RTP SN interpretation window. The one or more instructions may cause the one or more processors to perform a decompression of the header of the received packet using a second RTP SN interpretation window. The second RTP SN interpretation window may be selected by the wireless communication device based on at least one of one or more values of the first RTP SN interpretation window or a size of the first RTP SN interpretation window.

In some aspects, an apparatus for wireless communication may include means for determining a decompression failure associated with a header of a received packet and a first RTP SN interpretation window. The apparatus may include means for performing a decompression of the header of the received packet using a second RTP SN interpretation window. The second RTP SN interpretation window may be selected by the apparatus based on at least one of one or more values of the first RTP SN interpretation window or a size of the first RTP SN interpretation window.

Aspects generally include a method, wireless communication device, computer program product, non-transitory computer-readable medium (e.g., for storing instructions), and user equipment (UE) as substantially described herein with reference to and as illustrated by the accompanying drawings.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIGS. 7A-7E are diagrams of an overview of example aspects described herein, in accordance with various aspects of the present disclosure.

FIG. 8 is a diagram illustrating an example process performed, for example by a wireless communication device, in accordance with various aspects of the present disclosure.

DETAILED DESCRIPTION

The detailed description set forth below, in connection with the appended drawings, is intended as a description of various configurations and is not intended to represent the only configurations in which the concepts described herein may be practiced. The detailed description includes specific details for providing a thorough understanding of the various concepts. However, it will be apparent to those skilled in the art that these concepts may be practiced without these specific details.

The techniques described herein may be used for one or more of various wireless communication networks such as code division multiple access (CDMA) networks, time division multiple access (TDMA) networks, frequency division multiple access (FDMA) networks, orthogonal FDMA (OFDMA) networks, single carrier FDMA (SC-FDMA) networks, or other types of networks. A CDMA network may implement a radio access technology (RAT) such as universal terrestrial radio access (UTRA), CDMA2000, and/or the like. UTRA may include wideband CDMA (WCDMA) and/or other variants of CDMA. CDMA2000 may include Interim Standard (IS)-2000, IS-95 and IS-856 standards. IS-2000 may also be referred to as 1× radio transmission technology (1×RTT), CDMA2000 1×, and/or the like. A TDMA network may implement a RAT such as global system for mobile communications (GSM), enhanced data rates for GSM evolution (EDGE), or GSM/EDGE radio access network (GERAN). An OFDMA network may implement a RAT such as evolved UTRA (E-UTRA), ultra mobile broadband (UMB), Institute of Electrical and Electronics Engineers (IEEE) 802.11 (Wi-Fi), IEEE 802.16 (WiMAX), IEEE 802.20, Flash-OFDM, and/or the like. UTRA and E-UTRA may be part of the universal mobile telecommunication system (UMTS). 3GPP long-term evolution (LTE) and LTE-Advanced (LTE-A) are example releases of UMTS that use E-UTRA, which employs OFDMA on the downlink and SC-FDMA on the uplink. UTRA, E-UTRA, UMTS, LTE, LTE-A and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the wireless networks and RATs mentioned above as well as other wireless networks and RATs.

Figure 1:
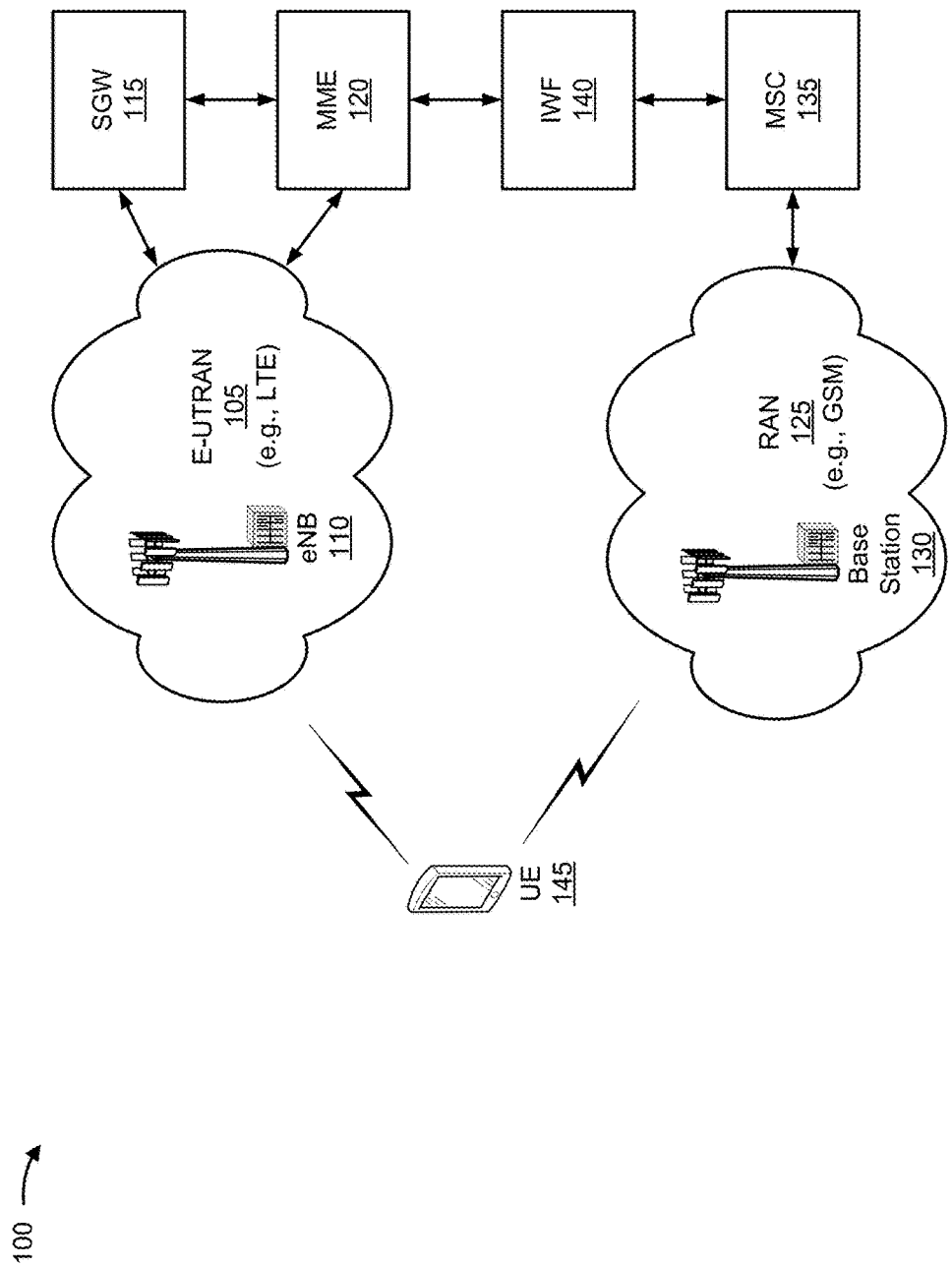
FIG. 1 is a diagram illustrating an example deployment in which multiple wireless networks have overlapping coverage, in accordance with various aspects of the present disclosure.

FIG. 1 is a diagram illustrating an example deployment 100 in which multiple wireless networks have overlapping coverage, in accordance with various aspects of the present disclosure. As shown, example deployment 100 may include a first radio access network (RAN), such as an evolved universal terrestrial radio access network (E-UTRAN) 105, which may include one or more evolved Node Bs (eNBs) 110, and which may communicate with other devices or networks via a serving gateway (SGW) 115 and/or a mobility management entity (MME) 120. As further shown, example deployment 100 may include a second RAN 125, which may include one or more base stations 130, and which may communicate with other devices or networks via a mobile switching center (MSC) 135 and/or an inter-working function (IWF) 140. As further shown, example deployment 100 may include one or more user equipments (UEs) 145 capable of communicating via E-UTRAN 105 and/or RAN 125.

E-UTRAN 105 may support, for example, LTE or another type of RAT. E-UTRAN 105 may include eNBs 110 and other network entities that can support wireless communication for UEs 145. Each eNB 110 may provide communication coverage for a particular geographic area. The term "cell" may refer to a coverage area of eNB 110 and/or an eNB subsystem serving the coverage area.

SGW 115 may communicate with E-UTRAN 105 and may perform various functions, such as packet routing and forwarding, mobility anchoring, packet buffering, initiation of network-triggered services, and/or the like. MME 120 may communicate with E-UTRAN 105 and SGW 115 and may perform various functions, such as mobility management, bearer management, distribution of paging messages, security control, authentication, gateway selection, and/or the like, for UEs 145 located within a geographic region served by MME 120 of E-UTRAN 105. The network entities in LTE are described in 3GPP TS 36.300, entitled "Evolved Universal Terrestrial Radio Access (E-UTRA) and Evolved Universal Terrestrial Radio Access Network (E-UTRAN); Overall description," which is publicly available.

RAN 125 may support, for example, GSM or another type of RAT. RAN 125 may include base stations 130 and other network entities that can support wireless communication for UEs 145. MSC 135 may communicate with RAN 125 and may perform various functions, such as voice services, routing for circuit-switched calls, and mobility management for UEs 145 located within a geographic region served by MSC 135 of RAN 125. In some aspects, IWF 140 may facilitate communication between MME 120 and MSC 135 (e.g., when E-UTRAN 105 and RAN 125 use different RATs). Additionally, or alternatively, MME 120 may communicate directly with an MME that interfaces with RAN 125, for example, without IWF 140 (e.g., when E-UTRAN 105 and RAN 125 use a common RAT). In some aspects, E-UTRAN 105 and RAN 125 may use a common frequency and/or a common RAT to communicate with UE 145. In some aspects, E-UTRAN 105 and RAN 125 may use different frequencies and/or different RATs to communicate with UEs 145.

In general, any number of wireless networks may be deployed in a given geographic area. Each wireless network may support a particular RAT and may operate on one or more frequencies. A RAT may also be referred to as a radio technology, an air interface, and/or the like. A frequency or frequency ranges may also be referred to as a carrier, a frequency channel, and/or the like. Each frequency or frequency range may support a single RAT in a given geographic area in order to avoid interference between wireless networks of different RATs.

UE 145 may be stationary or mobile and may also be referred to as a mobile station, a terminal, an access terminal, a wireless communication device, a subscriber unit, a station, and/or the like. UE 145 may be a cellular phone, a personal digital assistant (PDA), a wireless modem, a wireless communication device, a handheld device, a laptop computer, a cordless phone, a wireless local loop (WLL) station, and/or the like.

Upon power up, UE 145 may search for wireless networks from which UE 145 can receive communication services. If UE 145 detects more than one wireless network, then a wireless network with the highest priority may be selected to serve UE 145 and may be referred to as the serving network. UE 145 may perform registration with the serving network, if necessary. UE 145 may then operate in a connected mode to actively communicate with the serving network. Alternatively, UE 145 may operate in an idle mode and camp on the serving network if active communication is not required by UE 145.

UE 145 may operate in the idle mode as follows. UE 145 may identify all frequencies/RATs on which it is able to find a "suitable" cell in a normal scenario or an "acceptable" cell in an emergency scenario, where "suitable" and "acceptable" are specified in the LTE standards. UE 145 may then camp on the frequency/RAT with the highest priority among all identified frequencies/RATs. UE 145 may remain camped on this frequency/RAT until either (i) the frequency/RAT is no longer available at a predetermined threshold or (ii) another frequency/RAT with a higher priority reaches this threshold. In some aspects, UE 145 may receive a neighbor list when operating in the idle mode, such as a neighbor list included in a system information block type 5 (SIB 5) provided by an eNB of a RAT on which UE 145 is camped. Additionally, or alternatively, UE 145 may generate a neighbor list. A neighbor list may include information identifying one or more frequencies, at which one or more RATs may be accessed, priority information associated with the one or more RATs, and/or the like.

Robust header compression (RoHC) may be performed to compress a header of a packet to a subset of bits of the header, thereby reducing an amount of network traffic associated with transmitting the packet. The subset of bits may be referred to as a set of least significant bits (LSBs) identifying an actual (e.g., a full, expanded, and/or resolved) real-time transport protocol (RTP) sequence number (SN) associated with the header of the packet. The packet and the set of LSBs may be received by UE 145 during a voice over LTE (VoLTE) call. UE 145 may attempt to identify an RTP SN associated with the packet, and may determine the RTP SN using the set of LSBs and an RTP SN interpretation window.

During a high jitter scenario, for example, it is more likely that UE 145 may receive packets out of order, resulting in UE 145 identifying an incorrect determined RTP SN, which does not match the actual RTP SN, for the packet based on the set of LSBs and the RTP SN interpretation window. UE 145 may attempt to perform an RoHC decompression of the header of the packet based on the incorrect determined RTP SN, and may perform a checksum, such as a cyclic redundancy check (CRC), to determine whether RoHC decompression of the header of the packet is successful. Based on utilizing the incorrect determined RTP SN for the packet, UE 145 may determine that RoHC decompression fails.

Based on determining that RoHC decompression fails, UE 145 may employ a different RTP SN interpretation window, for example, by shifting the RTP SN interpretation window, by an amount equal to a multiple of the size of the RTP SN interpretation window, to determine a shifted RTP SN interpretation window. In this case, when UE 145 determines, for the set of LSBs, a determined RTP SN from the shifted RTP SN interpretation window, the determined RTP SN may match the actual RTP SN, and UE 145 may perform RoHC decompression successfully.

In this way, UE 145 performs a successful RoHC decompression of a header of a received packet that is received out of order, thereby reducing a likelihood of a dropped packet and improving network performance relative to another technique that does not permit an RTP SN interpretation window to be altered. Moreover, by reducing a likelihood of dropping packets, UE 145 may utilize a smaller RTP SN interpretation window associated with a smaller set of LSBs relative to another technique and without excessive quantities of packets being dropped, thereby improving RoHC compression and reducing network traffic and/or utilization of memory resources.

The number and arrangement of devices and networks shown in FIG. 1 are provided as an example. In practice, there may be additional devices and/or networks, fewer devices and/or networks, different devices and/or networks, or differently arranged devices and/or networks than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g., one or more devices) shown in FIG. 1 may perform one or more functions described as being performed by another set of devices shown in FIG. 1.

Figure 2:
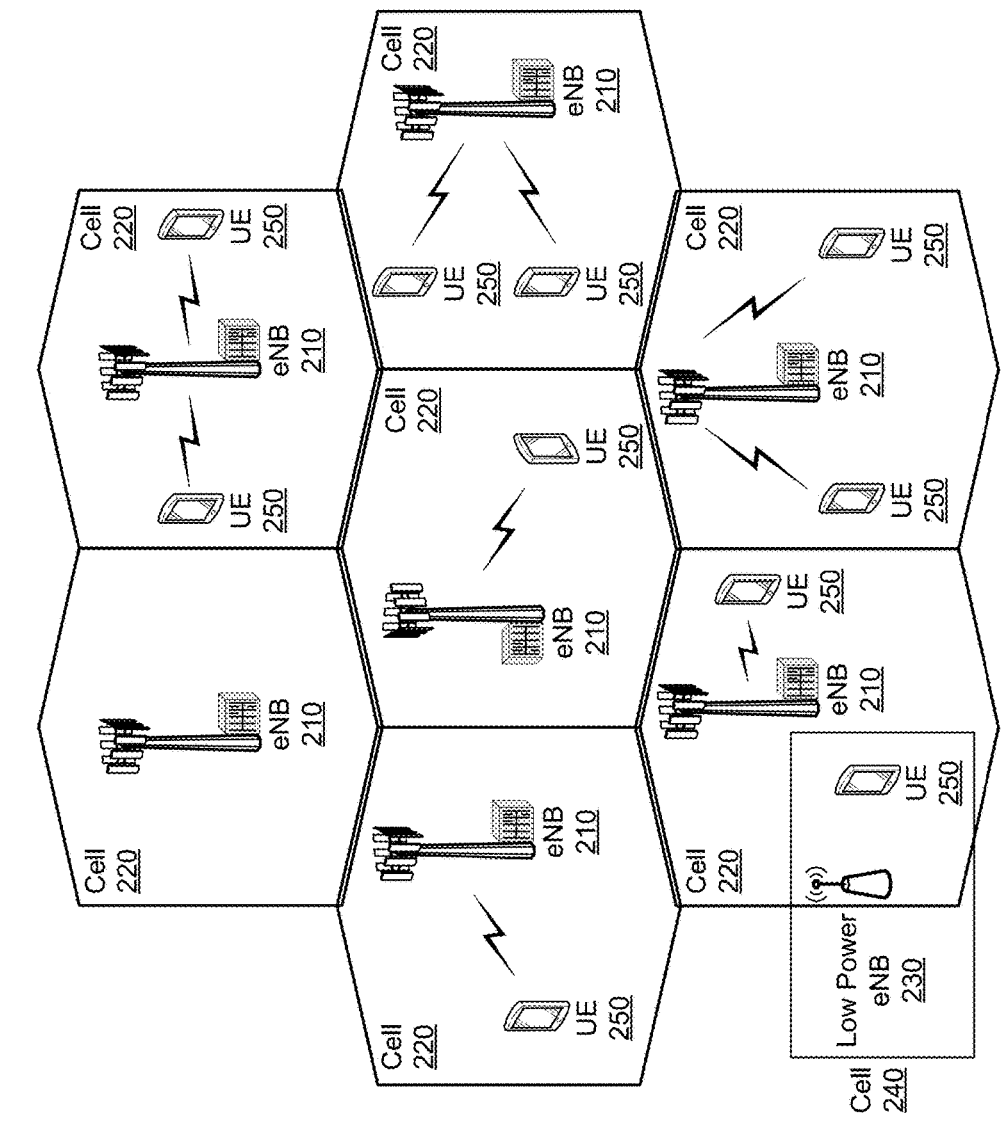
FIG. 2 is a diagram illustrating an example access network in an LTE network architecture, in accordance with various aspects of the present disclosure.

FIG. 2 is a diagram illustrating an example access network 200 in an LTE network architecture, in accordance with various aspects of the present disclosure. As shown, access network 200 may include one or more eNBs 210 that serve a corresponding set of cellular regions (cells) 220, one or more low power eNBs 230 that serve a corresponding set of cells 240, and a set of UEs 250.

Each eNB 210 may be assigned to a respective cell 220 and may be configured to provide an access point to a RAN. For example, eNB 110, 210 may provide an access point for UE 145, 250 to E-UTRAN 105 (e.g., eNB 210 may correspond to eNB 110, shown in FIG. 1) or may provide an access point for UE 145, 250 to RAN 125 (e.g., eNB 210 may correspond to base station 130, shown in FIG. 1). UE 145, 250 may correspond to UE 145, shown in FIG. 1. FIG. 2 does not illustrate a centralized controller for example access network 200, but access network 200 may use a centralized controller in some aspects. The eNBs 210 may perform radio related functions including radio bearer control, admission control, mobility control, scheduling, security, and network connectivity (e.g., to SGW 115).

As shown in FIG. 2, one or more low power eNBs 230 may serve respective cells 240, which may overlap with one or more cells 220 served by eNBs 210. The eNBs 230 may correspond to eNB 110 associated with E-UTRAN 105 and/or base station 130 associated with RAN 125, shown in FIG. 1. A low power eNB 230 may be referred to as a remote radio head (RRH). The low power eNB 230 may include a femto cell eNB (e.g., home eNB (HeNB)), a pico cell eNB, a micro cell eNB, and/or the like.

UE 145, 250 may receive a packet, which is associated with a header compressed using RoHC, from or via an eNB 110, 130, 210, 230 and/or another UE 145, 250. UE 145, 250 may determine an RTP SN value for the packet based on a set of LSBs received by UE 145, 250 and using a first RTP SN interpretation window. UE 145, 250 may perform RoHC decompression based on the RTP SN value, and perform a checksum to determine a result of the RoHC decompression. UE 145, 250 may determine, based on the checksum, that the RoHC decompression failed for the RTP SN, and may perform another RoHC decompression using a second RTP SN interpretation window, which is associated with a lower limit value and a higher limit value that are shifted based on a lower limit value and a higher limit value of the first RTP SN interpretation window and/or a size of the first RTP interpretation window. UE 145, 250 may identify another RTP SN based on performing the other RoHC decompression using the second RTP SN interpretation window, and may determine that a CRC associated with the other RoHC decompression is successful. In this way, UE 145, 250 is more likely to successfully perform RoHC decompression relative to dropping the packet after an RoHC decompression failure.

A modulation and multiple access scheme employed by access network 200 may vary depending on the particular telecommunications standard being deployed. In LTE applications, OFDM is used on the downlink (DL) and SC-FDMA is used on the uplink (UL) to support both frequency division duplexing (FDD) and time division duplexing (TDD). The various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. As another example, these concepts may also be extended to UTRA employing WCDMA and other variants of CDMA (e.g., such as TD-SCDMA, GSM employing TDMA, E-UTRA, and/or the like), UMB, IEEE 802.11 (Wi-Fi), IEEE 802.16 (WiMAX), IEEE 802.20, Flash-OFDM employing OFDMA, and/or the like. UTRA, E-UTRA, UMTS, LTE, and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 110, 210, 230 may have multiple antennas supporting MIMO technology. The use of MIMO technology enables eNBs 110, 210, 230 to exploit the spatial domain to support spatial multiplexing, beamforming, and transmit diversity. Spatial multiplexing may be used to transmit different streams of data simultaneously on the same frequency. The data streams may be transmitted to a single UE 145, 250 to increase the data rate or to multiple UEs 250 to increase the overall system capacity. This may be achieved by spatially precoding each data stream (e.g., applying a scaling of an amplitude and a phase) and then transmitting each spatially precoded stream through multiple transmit antennas on the DL. The spatially precoded data streams arrive at the UE(s) 250 with different spatial signatures, which enables each of the UE(s) 250 to recover the one or more data streams destined for that UE 145, 250. On the UL, each UE 145, 250 transmits a spatially precoded data stream, which enables eNBs 110, 210, 230 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

The number and arrangement of devices and cells shown in FIG. 2 are provided as an example. In practice, there may be additional devices and/or cells, fewer devices and/or cells, different devices and/or cells, or differently arranged devices and/or cells than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) shown in FIG. 2 may perform one or more functions described as being performed by another set of devices shown in FIG. 2.

Figure 3:
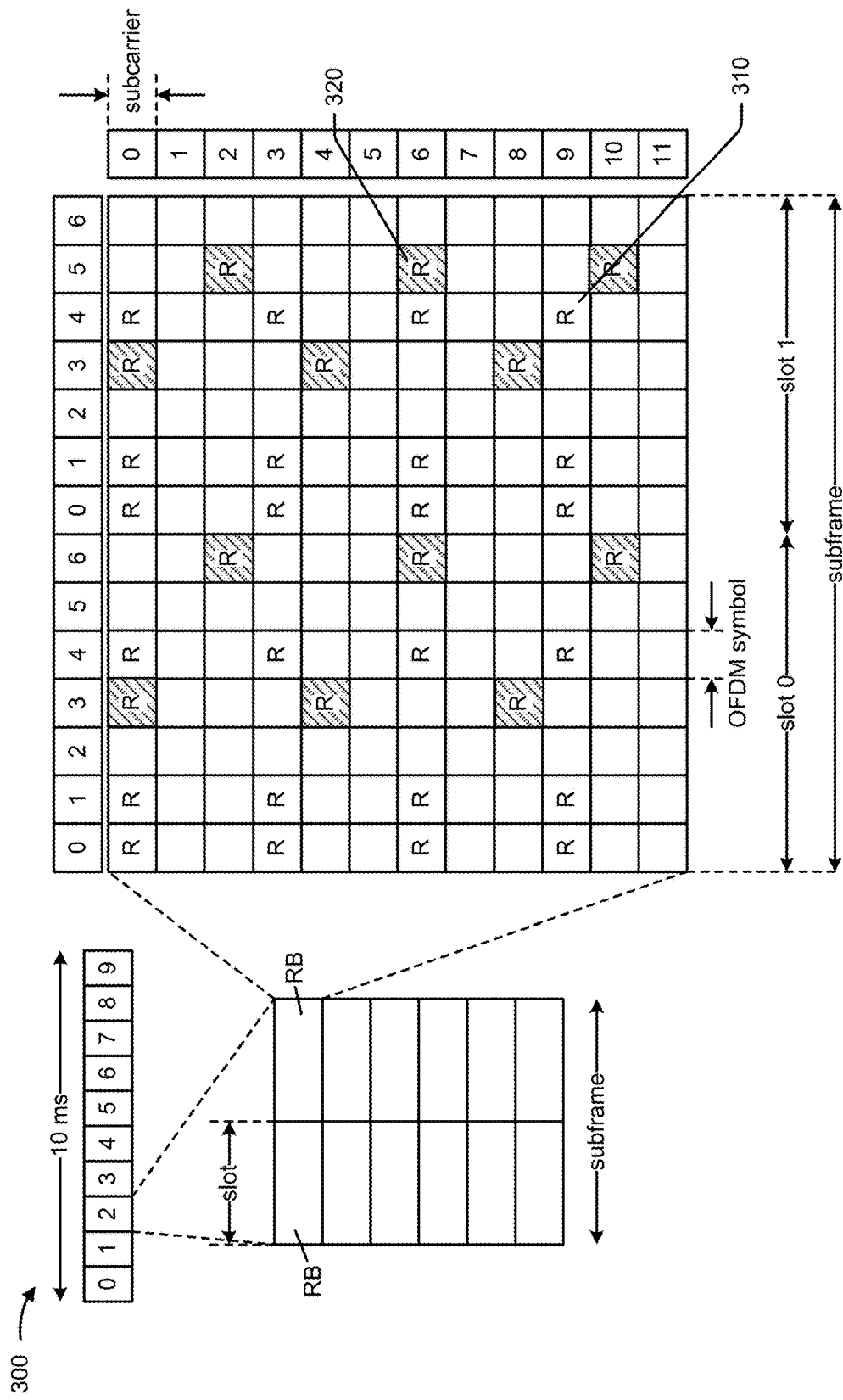
FIG. 3 is a diagram illustrating an example of a downlink frame structure in LTE, in accordance with various aspects of the present disclosure.

FIG. 3 is a diagram illustrating an example 300 of a downlink (DL) frame structure in LTE, in accordance with various aspects of the present disclosure. A frame (e.g., of 10 ms) may be divided into 10 equally sized sub-frames with indices of 0 through 9. Each sub-frame may include two consecutive time slots. A resource grid may be used to represent two time slots, each time slot including a resource block (RB). The resource grid is divided into multiple resource elements. In LTE, a resource block includes 12 consecutive subcarriers in the frequency domain and, for a normal cyclic prefix in each OFDM symbol, 7 consecutive OFDM symbols in the time domain, or 84 resource elements. For an extended cyclic prefix, a resource block includes 6 consecutive OFDM symbols in the time domain and has 72 resource elements. Some of the resource elements, as indicated as R 310 and R 320, include DL reference signals (DL-RS). The DL-RS include Cell-specific RS (CRS) (also sometimes called common RS) 310 and UE-specific RS (UE-RS) 320. UE-RS 320 are transmitted only on the resource blocks upon which the corresponding physical DL shared channel (PDSCH) is mapped. The number of bits carried by each resource element depends on the modulation scheme. Thus, the more resource blocks that a UE receives and the higher the modulation scheme, the higher the data rate for the UE.

In LTE, an eNB may send a primary synchronization signal (PSS) and a secondary synchronization signal (SSS) for each cell in the eNB. The primary and secondary synchronization signals may be sent in symbol periods 6 and 5, respectively, in each of subframes 0 and 5 of each radio frame with the normal cyclic prefix (CP). The synchronization signals may be used by UEs for cell detection and acquisition. The eNB may send a Physical Broadcast Channel (PBCH) in symbol periods 0 to 3 in slot 1 of subframe 0. The PBCH may carry certain system information.

The eNB may send a Physical Control Format Indicator Channel (PCFICH) in the first symbol period of each subframe. The PCFICH may convey the number of symbol periods (M) used for control channels, where M may be equal to 1, 2, or 3 and may change from subframe to subframe. M may also be equal to 4 for a small system bandwidth, e.g., with less than 10 resource blocks. The eNB may send a Physical HARQ Indicator Channel (PHICH) and a Physical Downlink Control Channel (PDCCH) in the first M symbol periods of each subframe. The PHICH may carry information to support hybrid automatic repeat request (HARQ). The PDCCH may carry information on resource allocation for UEs and control information for downlink channels. The eNB may send a Physical Downlink Shared Channel (PDSCH) in the remaining symbol periods of each subframe. The PDSCH may carry data for UEs scheduled for data transmission on the downlink.

The eNB may send the PSS, SSS, and PBCH in the center 1.08 MHz of the system bandwidth used by the eNB. The eNB may send the PCFICH and PHICH across the entire system bandwidth in each symbol period in which these channels are sent. The eNB may send the PDCCH to groups of UEs in certain portions of the system bandwidth. The eNB may send the PDSCH to specific UEs in specific portions of the system bandwidth. The eNB may send the PSS, SSS, PBCH, PCFICH, and PHICH in a broadcast manner to all UEs, may send the PDCCH in a unicast manner to specific UEs, and may also send the PDSCH in a unicast manner to specific UEs.

A number of resource elements may be available in each symbol period. Each resource element (RE) may cover one subcarrier in one symbol period and may be used to send one modulation symbol, which may be a real or complex value. Resource elements not used for a reference signal in each symbol period may be arranged into resource element groups (REGs). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1, and 2. The PDCCH may occupy 9, 18, 36, or 72 REGs, which may be selected from the available REGs, in the first M symbol periods, for example. Only certain combinations of REGs may be allowed for the PDCCH.

A UE may know the specific REGs used for the PHICH and the PCFICH. The UE may search different combinations of REGs for the PDCCH. The number of combinations to search is typically less than the number of allowed combinations for the PDCCH. An eNB may send the PDCCH to the UE in any of the combinations that the UE will search.

UE 145, 250 may receive information via a DL frame, as described herein. For example, UE 145, 250 may receive a packet, information identifying a set of LSBs associated with a header of the packet, and/or the like. In some aspects, UE 145, 250 may determine an RoHC decompression failure for an attempted RoHC decompression of the header of the packet using a first RTP SN interpretation window, and may successfully perform another RoHC decompression of the header of the packet based on an RTP SN determined using a second RTP SN interpretation window selected based on the first RTP SN interpretation window.

As indicated above, FIG. 3 is provided as an example. Other examples are possible and may differ from what was described above in connection with FIG. 3.

Figure 4:
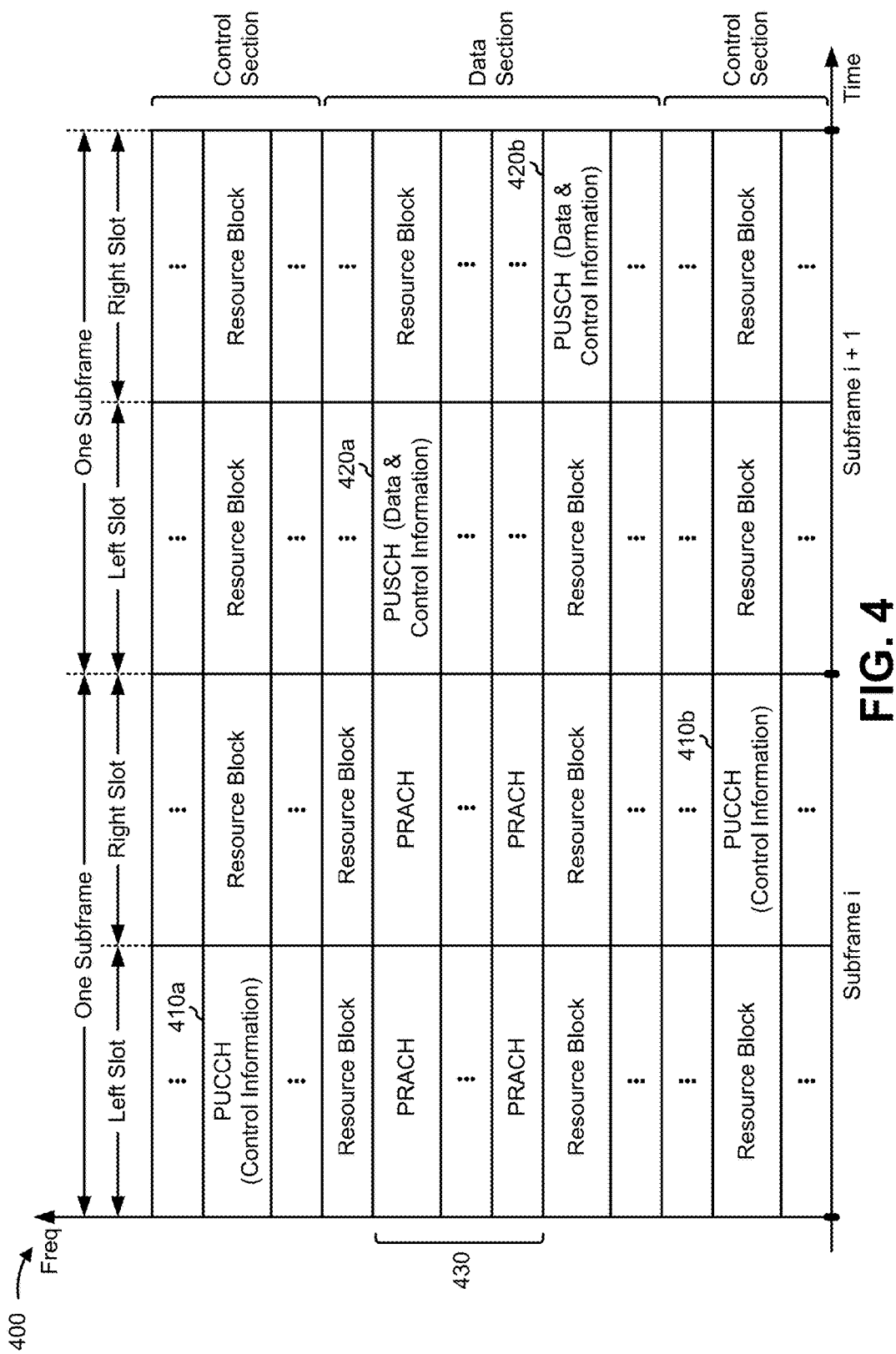
FIG. 4 is a diagram illustrating an example of an uplink frame structure in LTE, in accordance with various aspects of the present disclosure.

FIG. 4 is a diagram illustrating an example 400 of an uplink (UL) frame structure in LTE, in accordance with various aspects of the present disclosure. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 410a, 410b in the control section to transmit control information to an eNB. The UE may also be assigned resource blocks 420a, 420b in the data section to transmit data to the eNB. The UE may transmit control information in a physical UL control channel (PUCCH) on the assigned resource blocks in the control section. The UE may transmit only data or both data and control information in a physical UL shared channel (PUSCH) on the assigned resource blocks in the data section. A UL transmission may span both slots of a subframe and may hop across frequencies.

A set of resource blocks may be used to perform initial system access and achieve UL synchronization in a physical random access channel (PRACH) 430. The PRACH 430 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (e.g., of 1 ms) or in a sequence of few contiguous subframes and a UE can make only a single PRACH attempt per frame (e.g., of 10 ms).

UE 145, 250 may transmit one or more signals vial a UL frame, as described herein. For example, UE 145, 250 may compress a set of packets via RoHC and may transmit information identifying a set of packets ordered in a first order via a set of UL frames. In this case, another network device, such as eNB 210, 230 and/or another UE 145, 250 may receive the set of packets in a second order that is different from the first order, and the other UE 145, 250 may perform RoHC decompression using, for a header of each packet, a first RTP SN interpretation window determined based on a previously successfully decompressed header of a packet or a second RTP SN interpretation window determined based on the first RTP SN interpretation window.

As indicated above, FIG. 4 is provided as an example. Other examples are possible and may differ from what was described above in connection with FIG. 4.

Figure 5:
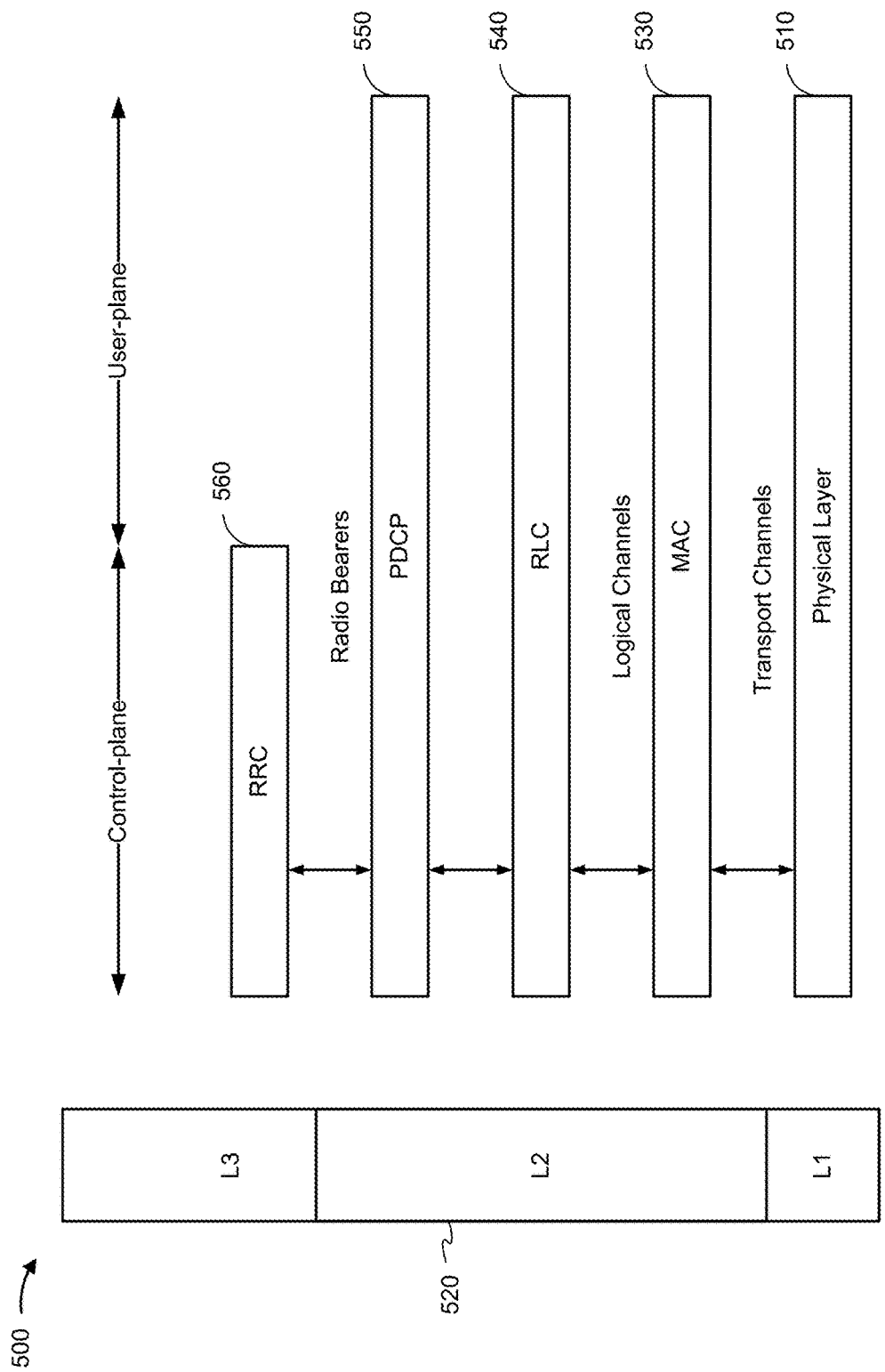
FIG. 5 is a diagram illustrating an example of a radio protocol architecture for a user plane and a control plane in LTE, in accordance with various aspects of the present disclosure.

FIG. 5 is a diagram illustrating an example 500 of a radio protocol architecture for a user plane and a control plane in LTE, in accordance with various aspects of the present disclosure. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 510. Layer 2 (L2 layer) 520 is above the physical layer 510 and is responsible for the link between the UE and eNB over the physical layer 510.

In the user plane, the L2 layer 520, for example, includes a media access control (MAC) sublayer 530, a radio link control (RLC) sublayer 540, and/or a packet data convergence protocol (PDCP) 550 sublayer, which are terminated at the eNB on the network side. Although not shown, the UE may have several upper layers above the L2 layer 520 including a network layer (e.g., IP layer) that is terminated at a packet data network (PDN) gateway on the network side, and an application layer that is terminated at the other end of the connection (e.g., far end UE, server, and/or the like).

The PDCP sublayer 550 provides multiplexing between different radio bearers and logical channels. The PDCP sublayer 550 also provides header compression for upper layer data packets to reduce radio transmission overhead (e.g., RoHC-based header compression), security by ciphering the data packets, and handover support for UEs between eNBs. The RLC sublayer 540 provides segmentation and reassembly of upper layer data packets, retransmission of lost data packets, and reordering of data packets to compensate for out-of-order reception due to hybrid automatic repeat request (HARQ). The MAC sublayer 530 provides multiplexing between logical and transport channels. The MAC sublayer 530 is also responsible for allocating the various radio resources (e.g., resource blocks) in one cell among the UEs. The MAC sublayer 530 is also responsible for HARQ operations.

In the control plane, the radio protocol architecture for the UE and eNB is substantially the same for the physical layer 510 and the L2 layer 520 with the exception that there is no header compression function for the control plane. The control plane also includes a radio resource control (RRC) sublayer 560 in Layer 3 (L3 layer). The RRC sublayer 560 is responsible for obtaining radio resources (e.g., radio bearers) and for configuring the lower layers using RRC signaling between the eNB and the UE.

As indicated above, FIG. 5 is provided as an example. Other examples are possible and may differ from what was described above in connection with FIG. 5.

Figure 6:
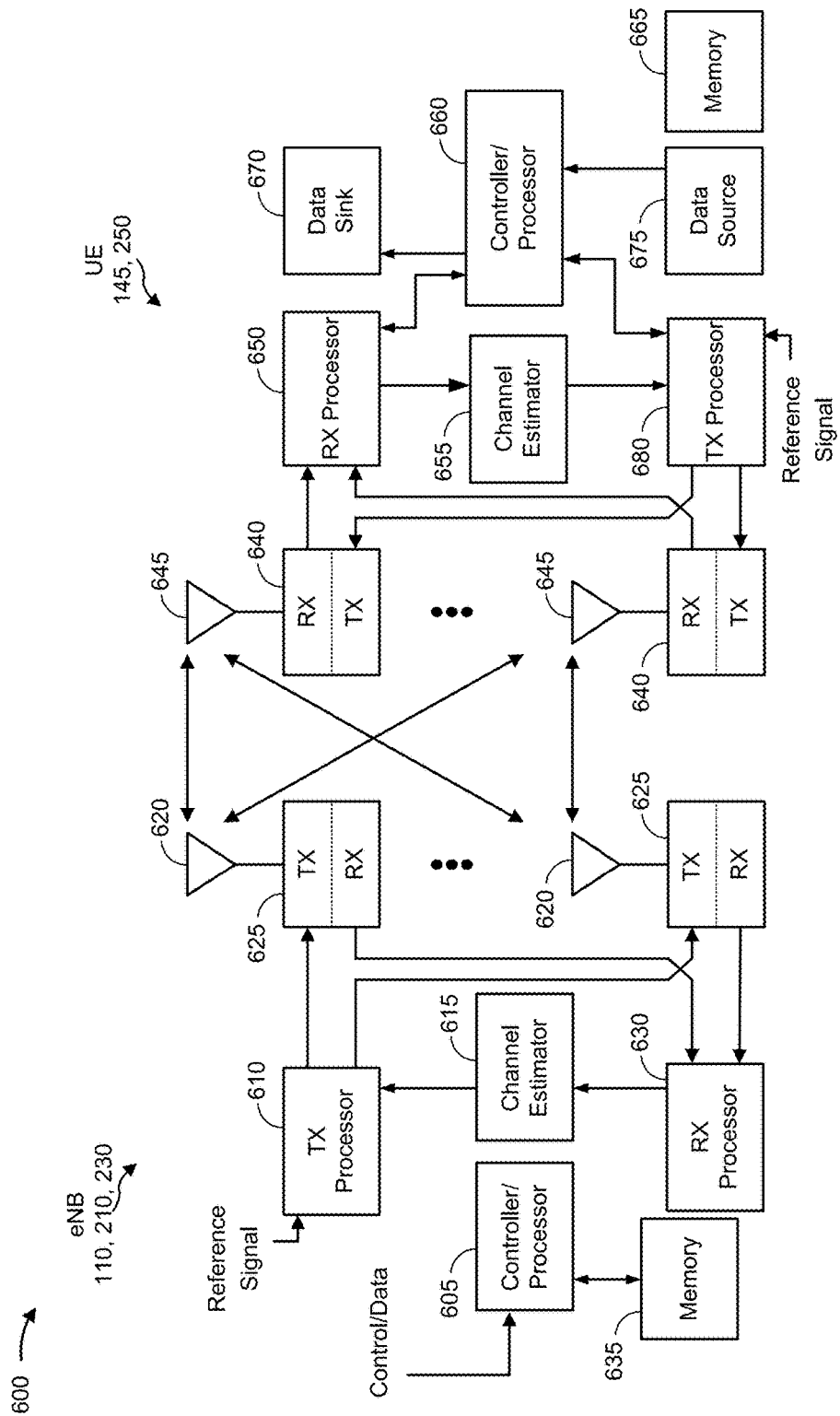
FIG. 6 is a diagram illustrating example components of an evolved Node B and a user equipment in an access network, in accordance with various aspects of the present disclosure.

FIG. 6 is a diagram illustrating example components 600 of eNB 110, 210, 230 and UE 145, 250 in an access network, in accordance with various aspects of the present disclosure. As shown in FIG. 6, eNB 110, 210, 230 may include a controller/processor 605, a transmitter (TX) processor 610, a channel estimator 615, an antenna 620, a transmitter 625TX, a receiver 625RX, a receiver (RX) processor 630, and a memory 635. As further shown in FIG. 6, UE 145, 250 may include a receiver RX 640RX, for example, of a transceiver TX/RX 640, a transmitter TX 640TX, for example, of a transceiver TX/RX 640, an antenna 645, an RX processor 650, a channel estimator 655, a controller/processor 660, a memory 665, a data sink 670, a data source 675, and a TX processor 680.

In the DL, upper layer packets from the core network are provided to controller/processor 605. The controller/processor 605 implements the functionality of the L2 layer. In the DL, the controller/processor 605 provides header compression, ciphering, packet segmentation and reordering, multiplexing between logical and transport channels, and radio resource allocations to the UE 145, 250 based, at least in part, on various priority metrics. The controller/processor 605 is also responsible for HARQ operations, retransmission of lost packets, and signaling to the UE 145, 250.

The TX processor 610 implements various signal processing functions for the L1 layer (e.g., physical layer). The signal processing functions includes coding and interleaving to facilitate forward error correction (FEC) at the UE 145, 250 and mapping to signal constellations based, at least in part, on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 615 may be used to determine the coding and modulation scheme, as well as for spatial processing. The channel estimate may be derived from a reference signal and/or channel condition feedback transmitted by the UE 145, 250. Each spatial stream is then provided to a different antenna 620 via a separate transmitter TX 640TX, for example, of transceiver TX/RX 625. Each such transmitter TX 640TX modulates an RF carrier with a respective spatial stream for transmission.

At the UE 145, 250, each receiver RX 640RX, for example, of a transceiver TX/RX 640 receives a signal through its respective antenna 645. Each such receiver RX 640RX recovers information modulated onto an RF carrier and provides the information to the receiver (RX) processor 650. The RX processor 650 implements various signal processing functions of the L1 layer. The RX processor 650 performs spatial processing on the information to recover any spatial streams destined for the UE 145, 250. If multiple spatial streams are destined for the UE 145, 250, the spatial streams may be combined by the RX processor 650 into a single OFDM symbol stream. The RX processor 650 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the eNB 110, 210, 230. These soft decisions may be based, at least in part, on channel estimates computed by the channel estimator 655. The soft decisions are then decoded and deinterleaved to recover the data and control signals that were originally transmitted by the eNB 110, 210, 230 on the physical channel. The data and control signals are then provided to the controller/processor 660.

The controller/processor 660 implements the L2 layer. The controller/processor 660 can be associated with a memory 665 that stores program codes and data. The memory 665 may include a non-transitory computer-readable medium. In the UL, the controller/processor 660 provides demultiplexing between transport and logical channels, packet reassembly, deciphering, header decompression (e.g., RoHC-based header decompression), control signal processing to recover upper layer packets from the core network. The upper layer packets are then provided to a data sink 670, which represents all the protocol layers above the L2 layer. Various control signals may also be provided to the data sink 670 for L3 processing. The controller/processor 660 is also responsible for error detection using a positive acknowledgement (ACK) and/or negative acknowledgement (NACK) protocol to support HARQ operations.

In the UL, a data source 675 is used to provide upper layer packets to the controller/processor 660. The data source 675 represents all protocol layers above the L2 layer. Similar to the functionality described in connection with the DL transmission by the eNB 110, 210, 230, the controller/processor 660 implements the L2 layer for the user plane and the control plane by providing header compression, ciphering, packet segmentation and reordering, and multiplexing between logical and transport channels based, at least in part, on radio resource allocations by the eNB 110, 210, 230. The controller/processor 660 is also responsible for HARQ operations, retransmission of lost packets, and signaling to the eNB 110, 210, 230.

Channel estimates derived by a channel estimator 655 from a reference signal or feedback transmitted by the eNB 110, 210, 230 may be used by the TX processor 680 to select the appropriate coding and modulation schemes, and to facilitate spatial processing. The spatial streams generated by the TX processor 680 are provided to different antenna 645 via separate transmitters TX, for example, of transceivers TX/RX 640. Each transmitter TX 640TX, for example, of transceiver TX/RX 640 modulates an RF carrier with a respective spatial stream for transmission.

The UL transmission is processed at the eNB 110, 210, 230 in a manner similar to that described in connection with the receiver function at the UE 145, 250. Each receiver RX 640RX, for example, of transceiver TX/RX 625 receives a signal through its respective antenna 620. Each receiver RX 640RX, for example, of transceiver TX/RX 625 recovers information modulated onto an RF carrier and provides the information to a RX processor 630. The RX processor 630 may implement the L1 layer.

The controller/processor 605 implements the L2 layer. The controller/processor 605 can be associated with a memory 635 that stores program code and data. The memory 635 may be referred to as a computer-readable medium. In the UL, the controller/processor 605 provides demultiplexing between transport and logical channels, packet reassembly, deciphering, header decompression, control signal processing to recover upper layer packets from the UE 145, 250. Upper layer packets from the controller/processor 605 may be provided to the core network. The controller/processor 605 is also responsible for error detection using an ACK and/or NACK protocol to support HARQ operations.

One or more components of UE 145, 250 may be configured to perform RoHC decompression, as described in more detail elsewhere herein. For example, the controller/processor 660 and/or other processors and modules of UE 145, 250 may perform or direct operations of, for example, process 800 of FIG. 8 and/or other processes as described herein. In some aspects, one or more of the components shown in FIG. 6 may be employed to perform process 800 of FIG. 8 and/or other processes for the techniques described herein.

The number and arrangement of components shown in FIG. 6 are provided as an example. In practice, there may be additional components, fewer components, different components, or differently arranged components than those shown in FIG. 6. Furthermore, two or more components shown in FIG. 6 may be implemented within a single component, or a single component shown in FIG. 6 may be implemented as multiple, distributed components. Additionally, or alternatively, a set of components (e.g., one or more components) shown in FIG. 6 may perform one or more functions described as being performed by another set of components shown in FIG. 6.

As described in more detail below, UE 145, 250 may receive packets out of order, for example, during a high jitter scenario. UE 145, 250 may determine an RoHC decompression failure associated with a header of a received packet, of the packets, and a first RTP SN interpretation window based on the packets being received out of order. UE 145, 250 may perform a decompression of the header of the received packet using a second RTP SN interpretation window that is selected based on one or more values for the first RTP SN interpretation window and/or a size of the first RTP SN interpretation window. In this way, UE 145, 250 improves a likelihood of RoHC decompression success relative to another technique that drops the received packet after an RoHC decompression failure. Additionally, or alternatively, UE 145, 250 may permit a reduced RTP SN interpretation window size associated with a reduces quantity of LSBs that are required to be transmitted to utilize the reduced RTP SN interpretation window size without causing an increase in a quantity of packets that are dropped, thereby improving packet header compression and/or reducing network traffic.

FIGS. 7A-7E are diagrams illustrating an example 700 of performing RoHC decompression, in accordance with various aspects of the present disclosure.

As shown in FIG. 7A, a UE 705 may perform an RoHC decompression for a header of a first packet. The first packet may be associated with a first actual RTP SN of 5006, which may be represented by a first set of LSBs 01110 (e.g., a final four bits of a binary value of 5006). UE 145, 250, 705 may determine a first RTP SN interpretation window:

$$f(v\_ref, k, p) = [v\_ref - p, v\_ref + (2^k - 1) - p];$$

$$f(5004, 4, 1) = [5003, 5018];$$

where v_ref is a zeroth RTP SN associated with a zeroth packet for which UE 145, 250, 705 performed a successful RoHC decompression prior to attempting to perform the decompression of the first packet, k is a quantity of LSBs that are transmitted for the first packet, and p is a configurable value associated with determining a proportion of the RTP SN interpretation window that is to be utilized for identifying an RTP SN associated with a delayed packet (e.g., a packet that is associated with an RTP SN less than the zeroth RTP SN and received after the zeroth packet) relative to identifying an RTP SN associated with an early arriving packet (e.g., a packet that is received immediately subsequent to the zeroth packet and is associated with an RTP SN greater than but not immediately subsequent to the zeroth RTP SN, numerically).

In some aspects, v_ref may be selected based on a zeroth RTP SN of a zeroth packet immediately preceding the first packet. For example, when the zeroth packet is determined to be associated with a zeroth RTP SN of 5004, UE 145, 250, 705 may store information identifying the zeroth RTP SN for utilization in determining the first RTP SN interpretation window.

In some aspects, v_ref may be selected based on an RTP SN of a zeroth packet, preceding the first packet, for which a corresponding RTP SN interpretation window was not shifted to perform RoHC decompression. For example, UE 145, 250, 705 may receive a first particular packet and successfully perform RoHC decompression, may receive a second particular packet and perform RoHC compression using a shifted RTP interpretation window, as described herein, and may receive a third particular packet. In this case, UE 145, 250, 705 may select an RTP SN associated with the first particular packet to determine an RTP SN interpretation window for the third particular packet. In this way, UE 145, 250, 705 reduces a likelihood that the second particular packet arriving out of order causes the RTP SN interpretation window for the third particular packet to fail to include an RTP SN associated with the third particular packet, thereby reducing utilization of processing resources relative to another technique that is caused to shift the RTP SN interpretation window for the third particular packet to perform decompression of the third particular packet.

As further shown in FIG. 7A, UE 145, 250, 705 may attempt to identify an RTP SN for the first packet based on a set of LSBs for the first packet and using the first RTP SN interpretation window. For example, based on the first actual RTP SN of 5006 being within the first RTP SN interpretation window of [5003, 5018], UE 145, 250, 705 may identify a first determined RTP SN of 5006 using the first RTP SN interpretation window. UE 145, 250, 705 may attempt to perform RoHC decompression, may perform a checksum (e.g., a CRC) based on results of performing the RoHC decompression, and, based on the first determined RTP SN matching the first actual RTP SN of the first packet, may determine that the CRC passes, indicating that RoHC decompression was successful for the header of the first packet. In this case, UE 145, 250, 705 selects the first determined RTP SN as the v_ref value for a second RTP SN interpretation window associated with RoHC decompression of a header of a second packet.

As shown in FIG. 7B, UE 145, 250, 705 may perform an RoHC decompression for the header of the second packet. The second packet may be associated with a second actual RTP SN of 5008, which may be represented by a second set of LSBs 0b0000 (e.g., a final four bits of a binary value of 5008). UE 145, 250, 705 may determine the second RTP SN interpretation window:

$$f(5006,4,1)=[5005,5020]$$

where 5006 is the v_ref value stored based on successfully performing RoHC decompression for the header of the first packet. Based on the second actual RTP SN of 5008 being within the second RTP SN interpretation window of [5005, 5020], UE 145, 250, 705 may identify a second determined RTP SN of 5008 using the second RTP SN interpretation window. UE 145, 250, 705 may attempt to perform RoHC decompression, may perform a checksum (e.g., a CRC) based on results of performing the RoHC decompression, and, based on the second determined RTP SN matching the second actual RTP SN of the second packet, may determine that the CRC passes, indicating that RoHC decompression was successful for the header of the second packet. In this case, UE 145, 250, 705 selects the second determined RTP SN as the v_ref value for a third RTP SN interpretation window associated with RoHC decompression of a header of a third packet.

As shown in FIG. 7C, UE 145, 250, 705 may perform an RoHC decompression for the header of the third packet. The third packet may be associated with a third actual RTP SN of 5009, which is represented by a third set of LSBs 0b0001 (e.g., a final four bits of a binary value of 5009). UE 145, 250, 705 may determine the third RTP SN interpretation window:

$$f(5008,4,1)=[5007,5022]$$

where 5008 is the v_ref value stored based on successfully performing RoHC decompression for the header of the second packet. Based on the second actual RTP SN of 5009 being within the second RTP SN interpretation window of [5007, 5022], UE 145, 250, 705 may identify a third determined RTP SN of 5009 using the third RTP SN interpretation window. UE 145, 250, 705 may attempt to perform RoHC decompression, may perform a checksum (e.g., a CRC) based on results of performing the RoHC decompression, and, based on the third determined RTP SN matching the third actual RTP SN of the third packet, may determine that the CRC passes, indicating that RoHC decompression was successful for the header of the third packet. In this case, UE 145, 250, 705 selects the third determined RTP SN as the v_ref value for a fourth RTP SN interpretation window associated with RoHC decompression of a header of a fourth packet.

Figure 7D:
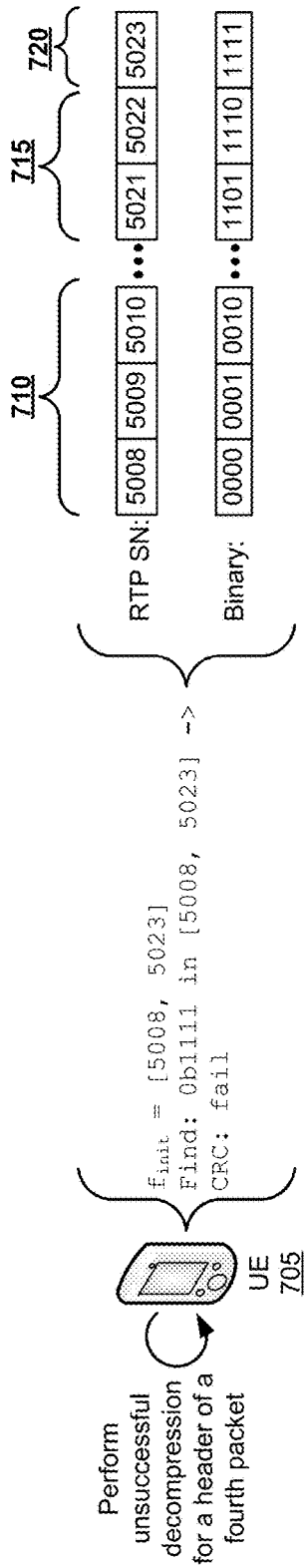

As shown in FIG. 7D, UE 145, 250, 705 may perform an RoHC decompression for the header of the fourth packet. The fourth packet may be associated with a fourth actual RTP SN of 5007 (e.g., a late arriving packet relative to the second packet with the second actual RTP SN of 5008 and the third packet with the third actual RTP SN of 5009), which is represented by a third set of LSBs 0b1111 (e.g., a final four bits of a binary value of 5007), which is the largest possible binary value for a set of four LSBs. UE 145, 250, 705 may determine a fourth RTP SN interpretation window:

$$f(5009,4,1)=[5008,5023];$$

where 5009 is the v_ref value stored based on successfully performing RoHC decompression for the header of the third packet. As shown by reference number 710, in the fourth RTP SN interpretation window, an RTP SN of 5008 is associated with a binary value of 0b0000. As shown by reference number 715, in the fourth RTP SN interpretation window, an RTP SN value of 5021 is associated with a binary value of 0b1101 and an RTP SN value of 5022 is associated with a binary value of 0b1110. Thus, as shown by reference number 720, when UE 145, 250, 705 identifies an RTP SN corresponding to the fourth set of LSBs 0b1111 using the fourth RTP SN interpretation window, UE 145, 250, 705 obtains a fourth determined RTP SN of 5023. UE 145, 250, 705 may attempt to perform RoHC decompression, may perform a checksum (e.g., a CRC) based on results of performing the RoHC decompression, and, based on the fourth determined RTP SN, 5023, not matching the fourth actual RTP SN, 5007, may determine that the CRC fails. In this way, UE 145, 250, 705 determines an RoHC decompression failure for an RoHC decompression of the header of the fourth packet.

Figure 7E:
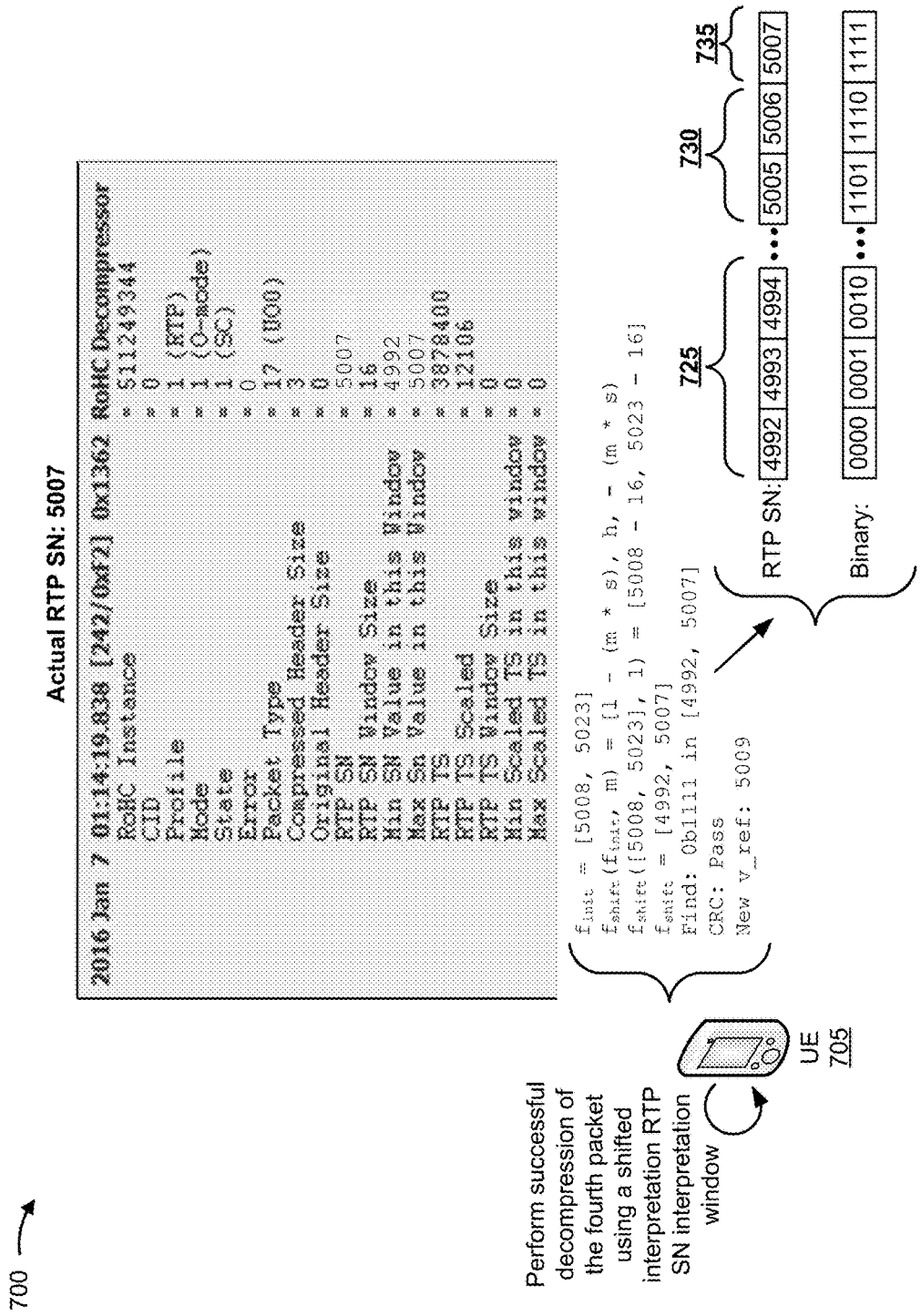

As shown in FIG. 7E, UE 145, 250, 705 may perform a decompression for the fourth packet using a shifted RTP SN interpretation window. UE 145, 250, 705 may determine a shifted fourth RTP SN interpretation window:

$$f_{shift}(f_{init},m)=[l-(m*s),h-(m*s)];$$

$$f_{shift}([5008,5023],1)=[5008-(1*16),5023-(1*16)];$$

$$f_{shift}=[4992,5007];$$

where $f_{shift}$ represents a shifted RTP SN interpretation window based on an initial RTP SN interpretation window, $f_{init}$ represents the initial RTP SN interpretation window, m represents a multiple of a size of the initial RTP SN interpretation window by which the initial RTP SN interpretation window is shifted, l represents a lower limit value of the initial RTP SN interpretation window, s represents the size of the initial RTP SN interpretation window, and h represents an upper limit value of the initial RTP SN interpretation window.

As further shown in FIG. 7E, and by reference number 725, in the shifted fourth RTP SN interpretation window, a binary value of 0b0000 is associated with an RTP SN value of 4992 (e.g., a shift of 16 relative to the third RTP SN interpretation window). As shown by reference number 730, an RTP SN value of 5005 is associated with a binary value of 0b1101 and an RTP SN value of 5006 is associated with a binary value of 0b1110 (e.g., a shift of 16 relative to the third RTP SN interpretation window). Thus, as shown by reference number 735, when UE 145, 250, 705 identifies a shifted fourth determined RTP SN corresponding to the fourth set of LSBs 0b1111, UE 145, 250, 705 obtains another fourth determined RTP SN (e.g., a fifth determined RTP SN) of 5007. UE 145, 250, 705 may attempt to perform RoHC decompression, may perform a checksum (e.g., a CRC) based on results of performing the RoHC decompression, and, based on the fifth determined RTP SN matching the fourth actual RTP SN of the fourth packet, may determine that the checksum (e.g., the CRC) passes, indicating that RoHC decompression was successful for the fourth packet.

In this way, UE 145, 250, 705 successfully performs RoHC decompression for an out of order packet after determining an RoHC decompression failure. Based on increasing a likelihood of successfully performing RoHC decompression for a header of a packet relative to another technique that permits the packet to be dropped after determining an RoHC decompression failure, UE 145, 250, 705 improves network performance. Moreover, UE 145, 250, 705 may utilize a smaller RTP SN interpretation window without excessive quantities of packets being dropped, thereby permitting fewer LSBs to be transmitted and improving compression of network traffic.

In some aspects, UE 145, 250, 705 may refrain from altering the v_ref value after decompressing the fourth packet based on shifting the fourth RTP SN interpretation window to successfully perform RoHC decompression for the header of the fourth packet. In this way, UE 145, 250, 705 reduces a likelihood that a single out of order packet (e.g., the fourth packet), which causes the RTP SN interpretation window to be shifted, causes additional RTP SN interpretation window adjustments to be performed for one or more subsequent packets, thereby reducing a utilization of processing resources relative to updating the v_ref value based on a packet for which a shifted RTP SN interpretation window was determined.

As indicated above, FIGS. 7A-7E are provided as an example. Other examples are possible and may differ from what was described with respect to FIGS. 7A-7E.

FIG. 8 is a diagram illustrating an example process 800 performed, for example, by a wireless communication device, in accordance with various aspects of the present disclosure. Example process 800 is an example where a wireless communication device (e.g., UE 145, 250, 705) performs decompression of a header of a received packet using a shifted RTP SN interpretation window.

As shown in FIG. 8, in some aspects, process 800 may include determining a decompression failure associated with a header of a received packet and a first RTP SN interpretation window (block 810). For example, a wireless communication device may determine a decompression failure associated with a header of a received packet and a first RTP SN interpretation window. In some aspects, the first RTP SN interpretation window may include one or more values, such as a lower limit value and an upper limit value. For example, the wireless communication device may select the lower limit value and the upper limit value for the RTP SN interpretation window based on a reference value associated with another packet (e.g., a packet immediately preceding the received packet), and may determine an RTP SN value for the received packet between the lower limit value and the upper limit value, inclusive, based on a set of LSBs associated with the received packet. In this case, the wireless communication device may attempt to perform a decompression of the header of the received packet based on the RTP SN value, and may fail to perform the decompression.

In some aspects, the wireless communication device may determine the decompression failure based on performing a checksum, such as a CRC. For example, the wireless communication device may attempt to perform a decompression of the header of the received packet using a first RTP SN interpretation window, may perform the CRC based on a result of the decompression of the header of the received packet using the first RTP SN interpretation window, and may determine the decompression failure based on performing the CRC (e.g., based on a result of the CRC). In this case, the wireless communication device may determine a second RTP SN interpretation window (e.g., the wireless communication device may shift the first RTP SN interpretation window), and may utilize the second RTP SN interpretation window to perform a decompression of the header of the received packet.

In some aspects, the received packet may be associated with a VoLTE call. For example, the wireless communication device may perform the VoLTE call with another wireless communication device, and may receive a set of packets associated with performing the VoLTE call out of order based on a relatively high jitter associated with a network connection between the wireless communication device and the other wireless communication device.

As shown in FIG. 8, in some aspects, process 800 may include performing a decompression of the header of the received packet using a second RTP SN interpretation window (block 820). For example, the wireless communication device may perform the decompression of the header of the received packet using the second RTP SN interpretation window. In some aspects, the second RTP SN interpretation window may be selected based on one or more values for the first RTP SN interpretation window. In some aspects, the second RTP SN interpretation window may be selected based on a size of the first RTP SN interpretation window. For example, the wireless communication device may shift the first RTP SN interpretation window (e.g., a lower limit value and/or an upper limit value) by a multiple of the size of the first RTP SN interpretation window to select the second RTP SN interpretation window.

In some aspects, the wireless communication device may perform the decompression of the header using a shifted RTP SN value. For example, the wireless communication device may shift a first determined RTP SN value by a size of the RTP SN interpretation window to select a second determined RTP SN value (e.g., without performing a comparison of the set of LSBs to a shifted RTP SN interpretation window). In this case, the wireless communication device may utilize the second determined RTP SN value for the decompression of the header of the received packet.

In some aspects, the wireless communication device may determine an RTP SN for the received packet based on a set of LSBs of the received packet and using the second RTP SN interpretation window, and may perform an RoHC decompression of the header based on the RTP SN for the received packet. For example, the wireless communication device may utilize the second RTP SN interpretation window to identify the RTP SN that corresponds to the set of LSBs of the received packet. In this case, the wireless communication device may perform an RoHC decompression of the header of the received packet based on the RTP SN for the received packet, may perform a checksum, such as a CRC, based on results of performing the decompression of the header, and may determine that the RoHC decompression is successful based on a result of the CRC.

In some implementations, the wireless communication device may perform a decompression of the header of the received packet based on determining that a packet data convergence layer (PDCP) SN of the received packet is within a threshold amount of another PDCP SN associated with another packet preceding the received packet. For example, the wireless communication device may store information identifying the PDCP SN of a first packet, and after determining a decompression failure for a second packet subsequent to the first packet using an RTP SN interpretation window, the wireless communication device may perform an RoHC decompression for the second packet using an adjusted RTP SN interpretation window and based on a second PDCP SN of the second packet being within a threshold amount of the first PDCP SN (e.g., a threshold amount being determined based on a size of the first RTP SN interpretation window).

Additionally, or alternatively, when the second PDCP SN is not within the threshold amount of the first PDCP SN, the wireless communication device may attempt to perform an RoHC decompression utilizing another technique. Additionally, or alternatively, the wireless communication device may perform the RoHC decompression based on a threshold relating to another type of SN. For example, the wireless communication device may perform the RoHC decompression based on a threshold relating to a link layer SN, a lower layer SN, or the like.

Additionally, or alternatively, the second RTP SN interpretation window may be selected based on at least one of one or more values for the first RTP SN interpretation window or a size of the first RTP SN interpretation window.

Additionally, or alternatively, process 800 may include determining the second RTP SN interpretation window based on subtracting the size of the first RTP SN interpretation window from or adding the size of the first RTP SN interpretation window to the one or more values of the first RTP SN interpretation window, and performing the decompression of the header of the received packet based on determining the second RTP SN interpretation window.

Additionally, or alternatively, process 800 may include determining the second RTP SN interpretation window based on subtracting a multiple of the size of the first RTP SN interpretation window from or adding the multiple of the size of the first RTP SN interpretation window to the one or more values of the first RTP SN interpretation window, and performing the decompression of the header of the received packet based on determining the second RTP SN interpretation window.

Additionally, or alternatively, the one or more values of the first RTP SN interpretation window may be a plurality of values, and the plurality of values may include a lower limit value and an upper limit value of the first RTP SN interpretation window.

Additionally, or alternatively, process 800 may include determining an RTP SN for the received packet based on a set of LSBs of the received packet, and performing the decompression of the header based on the RTP SN for the received packet. Additionally, or alternatively, the set of LSBs of the received packet may represent a reduced RTP SN.

Additionally, or alternatively, process 800 may include performing a decompression of the header of the received packet using a first RTP SN interpretation window prior to performing the decompression of the header of the received packet using the second RTP SN interpretation window, performing a checksum based on a result of the decompression of the header of the received packet using the first RTP SN interpretation window, and determining the decompression failure based on performing the checksum.

Additionally, or alternatively, the received packet may be associated with a VoLTE call.

Additionally, or alternatively, the first RTP SN interpretation window may be based on a particular RTP SN value associated with a successfully decompressed packet preceding the received packet.

Additionally, or alternatively, process 800 may include receiving another packet subsequent to the received packet, and performing another decompression associated with the other packet subsequent to the received packet using a particular RTP SN interpretation window selected based on the successfully decompressed packet preceding the received packet and selected based on determining the decompression failure associated with the header of the received packet and the first RTP SN interpretation window.

Additionally, or alternatively, the header of the received packet may be a compressed based on an RoHC procedure, and process 800 may include performing the decompression of the header based on an RoHC decompression procedure.

Additionally, or alternatively, process 800 may include performing the decompression of the header of the received packet based on determining that a packet data convergence protocol (PDCP) SN of the received packet is within a threshold amount of another lower layer (LL) SN associated with another packet preceding the received packet, and the threshold amount being determined based on the size of the first RTP SN interpretation window.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Techniques and apparatuses described herein may cause a wireless communication device to perform an RoHC decompression of a header of a packet, after determining an RoHC decompression failure performed using a first RTP SN interpretation interval, using a second RTP SN interpretation interval that is selected based on the first RTP SN interpretation interval. This may improve a likelihood that the header of the packet is successfully decompressed relative to dropping the packet after determining the RoHC decompression failure. Moreover, the wireless communication device may utilize a reduced quantity of LSBs without excessive quantities of dropped packets relative to another technique, thereby reducing network traffic and/or utilization of memory resources.

The foregoing disclosure provides illustration and description, but is not intended to be exhaustive or to limit the aspects to the precise form disclosed. Modifications and variations are possible in light of the above disclosure or may be acquired from practice of the aspects.

As used herein, the term component is intended to be broadly construed as hardware, firmware, or a combination of hardware and software. As used herein, a processor is implemented in hardware, firmware, or a combination of hardware and software.

Some aspects are described herein in connection with thresholds. As used herein, satisfying a threshold may refer to a value being greater than the threshold, greater than or equal to the threshold, less than the threshold, less than or equal to the threshold, equal to the threshold, not equal to the threshold, and/or the like.

It will be apparent that systems and/or methods, described herein, may be implemented in different forms of hardware, firmware, or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of possible aspects. In fact, many of these features may be combined in ways not specifically recited in the claims and/or disclosed in the specification. Although each dependent claim listed below may directly depend on only one claim, the disclosure of possible aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the term "one" or similar language is used. Also, as used herein, the terms "has," "have," "having," and/or the like are intended to be open-ended terms. Further, the phrase "based on" is intended to mean, "based, at least in part, on" unless explicitly stated otherwise.

What is claimed is:

1. A method for wireless communication, comprising:
   determining, by a wireless communication device, a decompression failure associated with a header of a received packet and a first real-time transport protocol (RTP) sequence number (SN) interpretation window; and
   performing, by the wireless communication device, a decompression of the header of the received packet using a second RTP SN interpretation window,
      the second RTP SN interpretation window being calculated based on at least one of one or more values of the first RTP SN interpretation window or a size of the first RTP SN interpretation window.

2. The method of claim 1, further comprising:
   determining the second RTP SN interpretation window based on subtracting the size of the first RTP SN interpretation window from or adding the size of the first RTP SN interpretation window to the one or more values of the first RTP SN interpretation window; and
   performing the decompression of the header of the received packet based on determining the second RTP SN interpretation window.

3. The method of claim 1, further comprising:
   determining the second RTP SN interpretation window based on subtracting a multiple of the size of the first RTP SN interpretation window from or adding the multiple of the size of the first RTP SN interpretation window to the one or more values of the first RTP SN interpretation window; and
   performing the decompression of the header of the received packet based on determining the second RTP SN interpretation window.

4. The method of claim 1, wherein the one or more values of the first RTP SN interpretation window is a plurality of values; and
   wherein the plurality of values includes a lower limit value and an upper limit value of the first RTP SN interpretation window.

5. The method of claim 1, further comprising:
   determining an RTP SN for the received packet based on a set of least significant bits (LSBs) of the received packet; and
   performing the decompression of the header based on the RTP SN for the received packet.

6. The method of claim 5, wherein the set of least significant bits (LSBs) of the received packet represents a reduced RTP SN.

7. The method of claim 1, further comprising:
   performing a decompression of the header of the received packet using a first RTP SN interpretation window prior to performing the decompression of the header of the received packet using the second RTP SN interpretation window;
   performing a checksum based on a result of the decompression of the header of the received packet using the first RTP SN interpretation window; and
   determining the decompression failure based on performing the checksum.

8. The method of claim 1, wherein the received packet is associated with a voice over long term evolution (VoLTE) call.

9. The method of claim 1, wherein the first RTP SN interpretation window is based on a particular RTP SN value associated with a successfully decompressed packet preceding the received packet.

10. The method of claim 9, further comprising:
    receiving another packet subsequent to the received packet; and
    performing another decompression, associated with the other packet subsequent to the received packet, using a particular RTP SN interpretation window,
       the particular RTP SN interpretation window being selected based on the successfully decompressed packet preceding the received packet, and
       the particular RTP SN interpretation window being selected based on determining the decompression failure associated with the header of the received packet and the first RTP SN interpretation window.

11. The method of claim 1, wherein the header of the received packet is compressed based on a robust header compression (RoHC) procedure; and
    the method further comprising:
       performing the decompression of the header based on an RoHC decompression procedure.

12. The method of claim 1, further comprising:
performing the decompression of the header of the received packet based on determining that a packet data convergence protocol (PDCP) SN of the received packet is within a threshold amount of another PDCP SN associated with another packet preceding the received packet,
the threshold amount being determined based on the size of the first RTP SN interpretation window.

13. A wireless communication device, comprising:
one or more processors configured to:
determine a decompression failure associated with a header of a received packet and a first real-time transport protocol (RTP) sequence number (SN) interpretation window; and
perform a decompression of the header of the received packet using a second RTP SN interpretation window,
the second RTP SN interpretation window being calculated based on at least one of one or more values of the first RTP SN interpretation window or a size of the first RTP SN interpretation window.

14. The wireless communication device of claim 13, wherein the one or more processors are further configured to:
determine the second RTP SN interpretation window based on subtracting the size of the first RTP SN interpretation window from or adding the size of the first RTP SN interpretation window to the one or more values of the first RTP SN interpretation window; and
perform the decompression of the header of the received packet based on determining the second RTP SN interpretation window.

15. The wireless communication device of claim 13, wherein the one or more processors are further configured to:
determine the second RTP SN interpretation window based on subtracting a multiple of the size of the first RTP SN interpretation window from or adding the multiple of the size of the first RTP SN interpretation window to the one or more values of the first RTP SN interpretation window; and
perform the decompression of the header of the received packet based on determining the second RTP SN interpretation window.

16. The wireless communication device of claim 13, wherein the one or more values of the first RTP SN interpretation window is a plurality of values; and
wherein the plurality of values includes a lower limit value and an upper limit value of the first RTP SN interpretation window.

17. The wireless communication device of claim 13, wherein the one or more processors are further configured to:
determine an RTP SN for the received packet based on a set of least significant bits (LSBs) of the received packet; and
perform the decompression of the header based on the RTP SN for the received packet.

18. The wireless communication device of claim 17, wherein the set of least significant bits (LSBs) of the received packet represents a reduced RTP SN.

19. The wireless communication device of claim 13, wherein the one or more processors are further configured to:
perform a decompression of the header of the received packet using a first RTP SN interpretation window prior to performing the decompression of the header of the received packet using the second RTP SN interpretation window;
perform a checksum based on a result of the decompression of the header of the received packet using the first RTP SN interpretation window; and
determine the decompression failure based on performing the checksum.

20. The wireless communication device of claim 13, wherein the received packet is associated with a voice over long term evolution (VoLTE) call.

21. The wireless communication device of claim 13, wherein the first RTP SN interpretation window is based on a particular RTP SN value associated with a successfully decompressed packet preceding the received packet.

22. The wireless communication device of claim 21, wherein the one or more processors are further configured to:
receive another packet subsequent to the received packet; and
perform another decompression, associated with the other packet subsequent to the received packet, using a particular RTP SN interpretation window,
the particular RTP SN interpretation window being selected based on the successfully decompressed packet preceding the received packet, and
the particular RTP SN interpretation window being selected based on determining the decompression failure associated with the header of the received packet and the first RTP SN interpretation window.

23. The wireless communication device of claim 13, wherein the header of the received packet is compressed based on a robust header compression (RoHC) procedure; and
wherein the one or more processors are further configured to:
perform the decompression of the header based on an RoHC decompression procedure.

24. The wireless communication device of claim 13, wherein the one or more processors are further configured to:
perform the decompression of the header of the received packet based on determining that a packet data convergence protocol (PDCP) SN of the received packet is within a threshold amount of another PDCP SN associated with another packet preceding the received packet,
the threshold amount being determined based on the size of the first RTP SN interpretation window.

25. A non-transitory computer-readable medium storing one or more instructions for wireless communication, the one or more instructions comprising:
one or more instructions that, when executed by one or more processors, cause the one or more processors to:
determine a decompression failure associated with a header of a received packet and a first real-time transport protocol (RTP) sequence number (SN) interpretation window; and
perform a decompression of the header of the received packet using a second RTP SN interpretation window,
the second RTP SN interpretation window being calculated based on at least one of one or more values of the first RTP SN interpretation window or a size of the first RTP SN interpretation window.

26. The non-transitory computer-readable medium of claim 25, wherein the one or more instructions, when executed by the one or more processors, further cause the one or more processors to:
determine the second RTP SN interpretation window based on subtracting the size of the first RTP SN interpretation window from or adding the size of the first RTP SN interpretation window to the one or more values of the first RTP SN interpretation window; and
perform the decompression of the header of the received packet based on determining the second RTP SN interpretation window.

27. The non-transitory computer-readable medium of claim 25, wherein the one or more instructions, when executed by the one or more processors, further cause the one or more processors to:
determine the second RTP SN interpretation window based on subtracting a multiple of the size of the first RTP SN interpretation window from or adding the multiple of the size of the first RTP SN interpretation window to the one or more values of the first RTP SN interpretation window; and
perform the decompression of the header of the received packet based on determining the second RTP SN interpretation window.

28. An apparatus for wireless communication, comprising:
means for determining a decompression failure associated with a header of a received packet and a first real-time transport protocol (RTP) sequence number (SN) interpretation window; and
means for performing a decompression of the header of the received packet using a second RTP SN interpretation window,
the second RTP SN interpretation window being calculated based on at least one of one or more values of the first RTP SN interpretation window or a size of the first RTP SN interpretation window.

29. The apparatus of claim 28, further comprising:
means for determining the second RTP SN interpretation window based on subtracting the size of the first RTP SN interpretation window from or adding the size of the first RTP SN interpretation window to the one or more values of the first RTP SN interpretation window; and
means for performing the decompression of the header of the received packet based on determining the second RTP SN interpretation window.

30. The apparatus of claim 28, further comprising:
means for determining the second RTP SN interpretation window based on subtracting a multiple of the size of the first RTP SN interpretation window from or adding the multiple of the size of the first RTP SN interpretation window to the one or more values of the first RTP SN interpretation window; and
means for performing the decompression of the header of the received packet based on determining the second RTP SN interpretation window.

* * * * *